US012259185B2

(12) United States Patent
Meese et al.

(10) Patent No.: US 12,259,185 B2
(45) Date of Patent: Mar. 25, 2025

(54) POWDER FEEDER SYSTEM AND METHOD FOR RECYCLING METAL POWDER

(71) Applicant: Continuum Powders Corporation, Cloverdale, CA (US)

(72) Inventors: Paul Meese, Healdsburg, CA (US); Matthew Charles, Cloverdale, CA (US); Sonia Zacher, Cloverdale, CA (US); Daniel Mendez, Healdsburg, CA (US)

(73) Assignee: Continuum Powders Corporation, Coverdale, CA (US)

( * ) Notice: Subject to any disclaimer, the term of this patent is extended or adjusted under 35 U.S.C. 154(b) by 814 days.

(21) Appl. No.: 17/516,776

(22) Filed: Nov. 2, 2021

(65) Prior Publication Data

US 2022/0136769 A1 May 5, 2022

Related U.S. Application Data

(60) Provisional application No. 63/109,436, filed on Nov. 4, 2020.

(51) Int. Cl.
*F27B 3/12* (2006.01)
*C22B 9/22* (2006.01)
*C22B 34/12* (2006.01)
*F27B 14/14* (2006.01)
*F27D 3/14* (2006.01)

(52) U.S. Cl.
CPC .................. *F27B 3/12* (2013.01); *C22B 9/22* (2013.01); *C22B 34/1295* (2013.01); *F27B 14/14* (2013.01); *F27D 3/14* (2013.01); *F27B 2003/125* (2013.01)

(58) Field of Classification Search
CPC ...... B22F 2009/0844; B22F 2009/0848; B22F 2009/0888; B22F 2009/0896; B22F 9/082; B33Y 70/00; C22B 34/1295; C22B 7/003; C22B 9/22; F27B 14/14; F27B 2003/125; F27B 3/12; F27B 3/18; F27B 3/19; F27B 3/22; F27B 3/28; F27D 19/00; F27D 3/14; Y02P 10/20
USPC ................ 373/72, 79, 81, 84, 85, 82, 18, 22
See application file for complete search history.

(56) References Cited

U.S. PATENT DOCUMENTS

| | | | |
|---|---|---|---|
| 7,137,436 B2 * | 11/2006 | Jackson | F27D 3/0033 164/506 |
| 9,925,591 B2 | 3/2018 | Eonta et al. | |
| 10,654,106 B2 | 5/2020 | Eonta et al. | |
| 11,235,389 B2 | 2/2022 | LaTour et al. | |
| 11,590,574 B2 | 2/2023 | LaTour et al. | |
| 11,623,278 B2 | 4/2023 | Eonta et al. | |
| 2016/0101468 A1 * | 4/2016 | An | B22F 1/102 75/229 |

(Continued)

*Primary Examiner* — Quang T Van
(74) *Attorney, Agent, or Firm* — Stephen A. Gratton

(57) ABSTRACT

A powder feeder system for a foundry system having a mixing hearth includes a housing assembly, and a feeder assembly in the housing assembly having a moveable barrel feeder for feeding a pre-weighed charge of metal powder into the mixing hearth of the foundry system during operation thereof. A method for recycling metal powder includes the steps of melting a content of the mixing hearth completely; and then feeding the metal powder into the mixing hearth while the contents of the mixing hearth are still molten using the powder feeder system.

20 Claims, 9 Drawing Sheets

(56) References Cited

U.S. PATENT DOCUMENTS

2020/0006390 A1    3/2020   LaTour et al.
2020/0189000 A1    6/2020   LaTour et al.
2021/0008621 A1    1/2021   Eonta et al.

* cited by examiner

POWDER FEEDER SYSTEM AND METHOD FOR RECYCLING METAL POWDER

CROSS REFERENCE TO RELATED APPLICATION

This application claims priority from U.S. Provisional No. 63/109,436, filed Nov. 4, 2020, which is incorporated herein by reference.

FIELD

This disclosure relates to a powder feeder system for a foundry system and to a method for recycling metal powder.

BACKGROUND

Metal powder used in additive manufacturing can be produced using a foundry system having a mixing hearth heated by a plasma torch in a sealed chamber. An exemplary foundry system is disclosed in U.S. Pat. No. 9,925,591 B2 to Eonta et al. In this type of foundry system, the mixing hearth and plasma torch are configured to melt a raw material into a molten metal. The raw material typically comprises a metal feedstock that can include recycled metals. It would be advantageous to have the capability to recycle metal powder in a foundry system having a mixing hearth.

However, there is no provision for a powder feeder on a foundry system having a mixing hearth. Additionally, these foundry systems typically produce metal powder that is from 40% to 50% too small to re-feed conventionally, or too large to be sold in the printing marketplace (e.g., 150 µm to 4760 µm). The only way to add this powder to the mixing hearth for re-melting is to add some powder under a charge or skull in the mixing hearth before starting the pumping cycle, which produces a very low recycle rate per run.

Some problems with powder feeding into a plasma environment include: 1) The plasma arc can blow powder out of the mixing hearth during heat source start and continuous running. This type of blowing event not only removes powder from the mixing hearth, but has the potential to create an alternate electrical path and cause a double arc torch failure. 2) Another problem involves sizing the discreet powder charge to match the pour throughput of the operation. 3) Also, not allowing recycled powder to circumvent the re-melt process and be harvested as fresh powder.

The present disclosure is directed to a powder feeder system for a foundry system configured to feed a metal powder, such as a recycled powder into a mixing hearth.

SUMMARY

A powder feeder system for a foundry system having a mixing hearth includes a housing assembly, and a feeder assembly in the housing assembly having a moveable barrel feeder configured to feed a pre-weighed charge of metal powder into the mixing hearth of the foundry system during operation thereof. The housing assembly includes tubular members configured to provide a sealed flow path for the metal powder to the mixing hearth.

The barrel feeder of the feeder assembly comprises a hollow cylindrical member having sidewalls, sealed end plates and an internal chamber for the metal powder. A feeder port opening extends through the sidewalls of the barrel feeder into the internal chamber thereof. The feeder assembly also includes a drive assembly configured to position the barrel feeder in a loading position in which the pre-weighed charge of the metal powder is loaded into the barrel feeder, or a feeding position in which the metal powder is inserted into the mixing hearth. The housing assembly can also include a hopper configured to feed the metal powder into the feeder port opening of the barrel feeder. The housing assembly sealingly attaches to a wall of the foundry system in a suitable location such as a view port. The powder feeder system allows pre-weighed charges of any size powder to be delivered on demand to the mixing hearth. In addition, the powder feeder system allows recycled metal powder to be efficiently melted in the mixing hearth.

A method for recycling a metal powder includes the steps of: providing a foundry system comprising a mixing hearth contained in a sealed reaction chamber; providing a powder feeder system for the foundry system comprising a housing assembly comprising a plurality of tubular members configured to provide a sealed flow path for the metal powder to the mixing hearth, and a feeder assembly having a moveable barrel feeder in the housing assembly for feeding a pre-weighed charge of the metal powder into the mixing hearth of the foundry system during operation thereof; melting a content of the mixing hearth to form a pool of molten metal; and feeding the metal powder into the mixing hearth while the contents of the mixing hearth are still molten using the powder feeder system. Prior to performing the melting step the mixing hearth can be loaded with a desired amount of metal, such as a feedstock or a recycled metal having a desired chemical composition.

DETAILED DESCRIPTION

Figure 1:
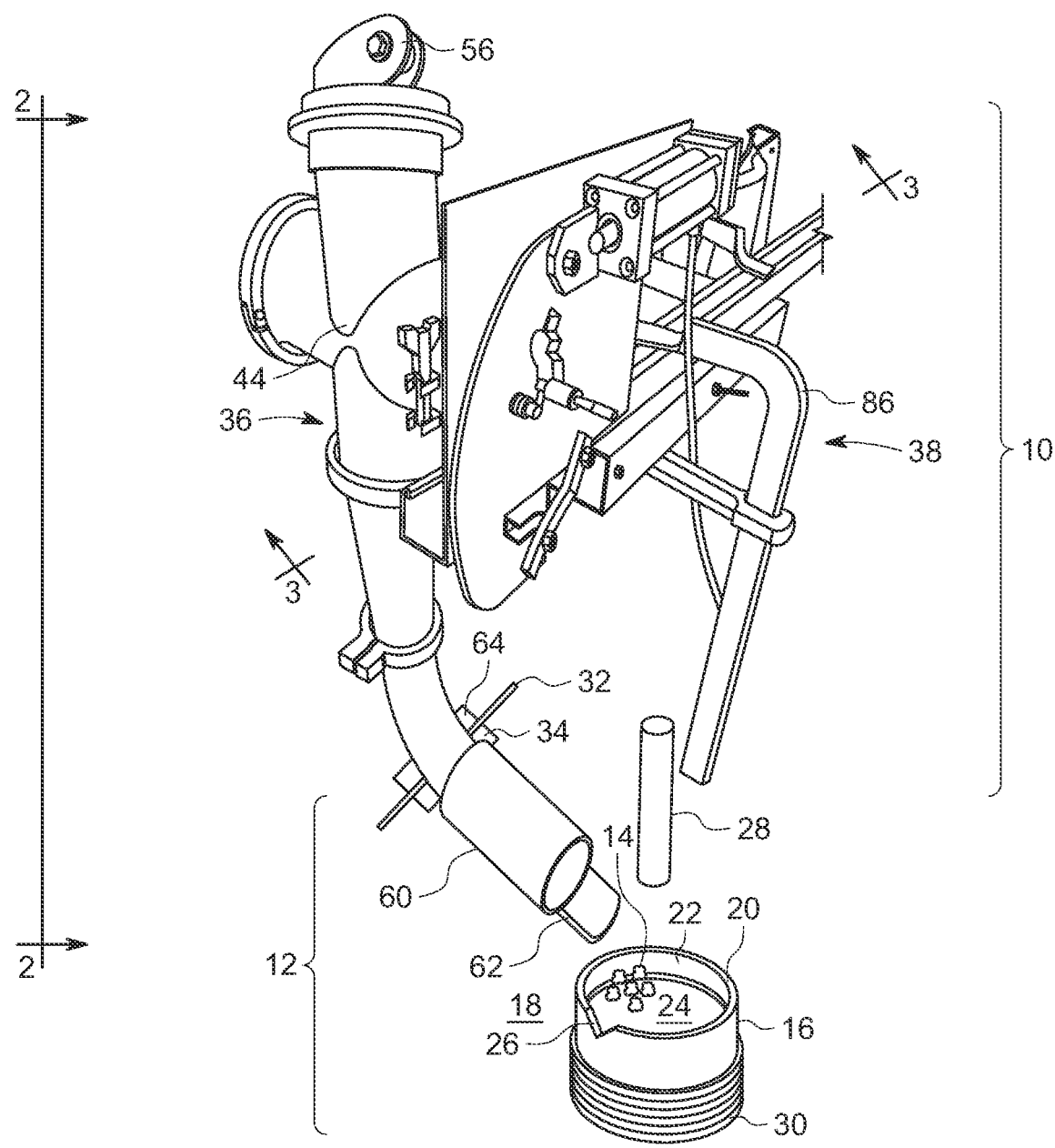
FIG. 1 is a schematic perspective view of a powder feeder system mounted to a foundry system having a mixing hearth in a sealed reaction chamber, with the foundry system shown cut away and with parts removed.

Referring to FIG. 1, a powder feeder system 10, and a foundry system 12 having a mixing hearth 16, are illustrated. The powder feeder system 10 is configured to feed a metal powder 14 into the mixing hearth 16 of the foundry system 12 during a melting process. Exemplary metals include titanium, zirconium, nickel, cobalt and alloys of these metals. In addition, the metal powder 14 can comprise a recycled metal powder having a diameter of from 1 μm to 4760 μm.

The mixing hearth 16 is contained within a sealed chamber 18 and includes walls 20 configured to form a melting cavity 22 for mixing and melting the metal powder 14 to form a pool of molten metal 24. The mixing hearth 16 also includes a pour notch 26 for pouring the pool of molten metal 24 into another receptacle (not shown) following the melting process. The foundry system 12 also includes a heat source 28, such as a plasma torch system, a plasma transferred arc system, an electric arc system, an induction system, a photon system, or an electron beam energy system, or a combination of one or more of these systems. The foundry system 12 also includes an induction coil 30 on the mixing hearth 16 and an external wall 32. U.S. Pat. No. 9,925,591 B2 to Eonta et al., which is incorporated herein by reference, discloses further components of the foundry system 12.

Figure 10:
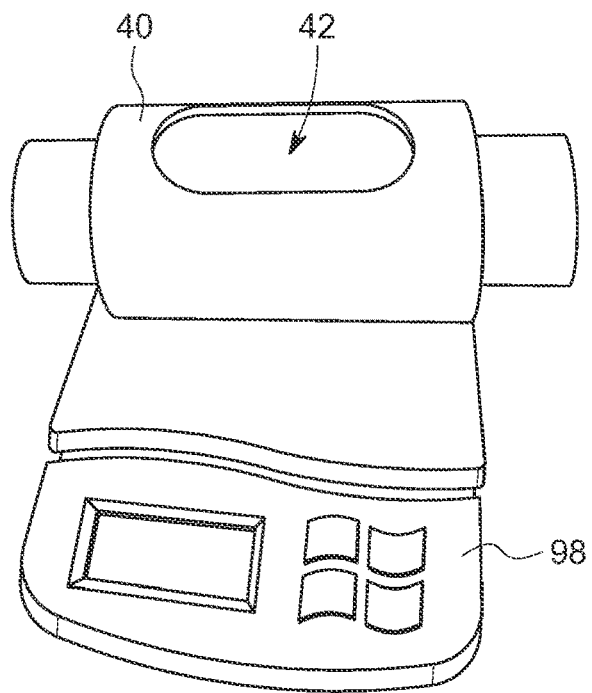
FIG. 10 is a perspective view of the feeder barrel with parts removed on a scale showing it's capability to hold a pre-weighed charge of the metal powder.

Still referring to FIG. 1, the powder feeder system 10 includes a housing assembly 36, and a feeder assembly 38 in the housing assembly 36 having a moveable barrel feeder 40 (FIG. 4) for containing a pre-weighed charge of metal powder 42 (FIG. 10).

Figure 2:
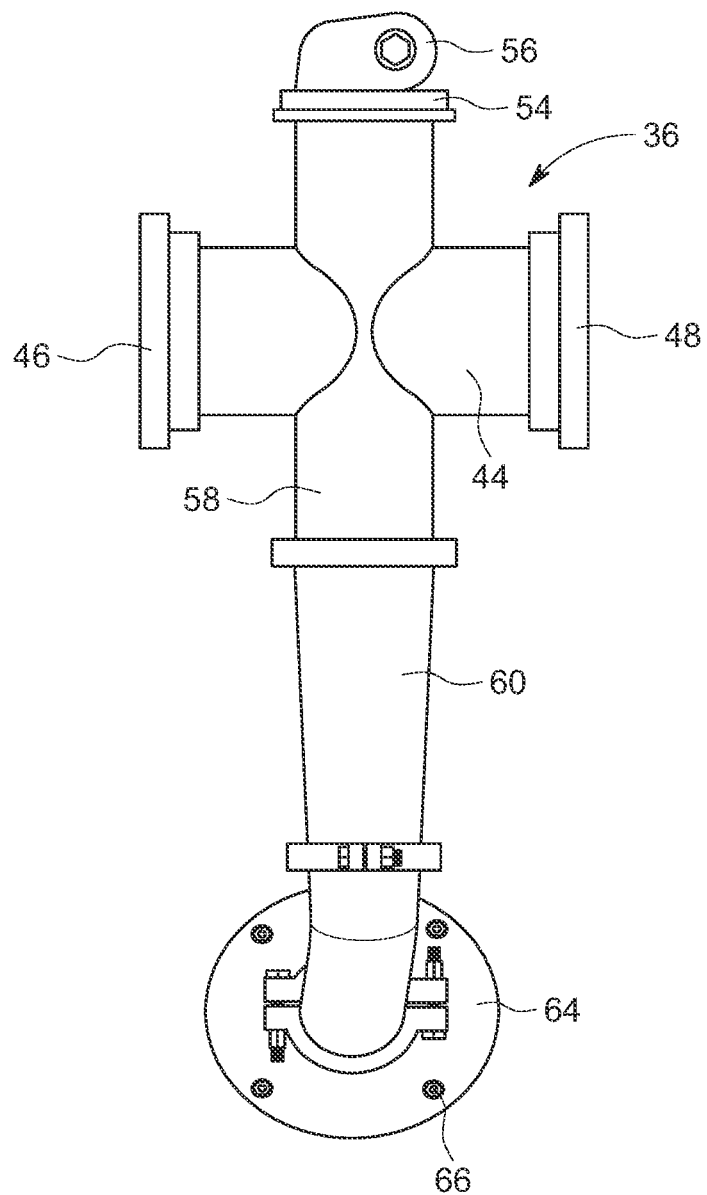
FIG. 2 is a side elevation view of the powder feeder system with parts removed taken along line 2-2 of FIG. 1 illustrating a housing assembly of the powder feeder system.

Referring to FIG. 2, the housing assembly 36 is shown separately in a side elevation view. The housing assembly 36 comprises metal tubular members bolted or welded together to provide a sealed flow path for the metal powder to the mixing hearth 16 (FIG. 1). In addition to providing a sealed flow path, components of the feeder assembly 38 are mounted within the housing assembly 36.

Figure 4:
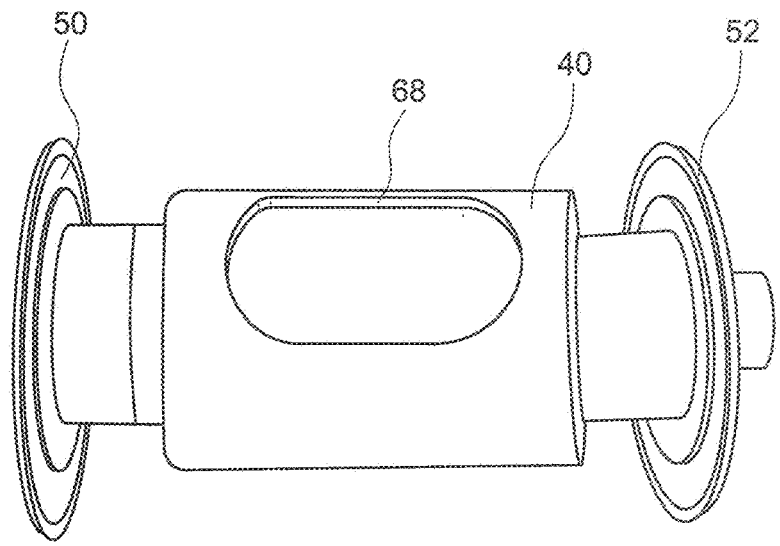
FIG. 4 is a perspective view of a barrel feeder of the feeder assembly illustrating a feeder port opening and end plates of the barrel feeder.

As shown in FIG. 2, the housing assembly 36 includes a cross fitting 44 wherein the barrel feeder 40 (FIG. 4) of the feeder assembly 38 is mounted for rotation. The cross fitting 44 includes a closed end left ring member 46 and an open ended right ring member 48 having a precisely dimensioned circular inside diameter. As shown in FIG. 4, the barrel feeder 40 includes a left end plate 50 and a right end plate 52 that are sized and shaped to support the barrel feeder 40 for rotation through an angle of from 0-360 degrees. In particular, the left end plate 50 and the right end plate 52 have precisely dimensioned circular outside diameters that are slightly less than the inside diameters of the left ring member 46 and the right ring member 48 on the cross fitting 44.

Figure 5:
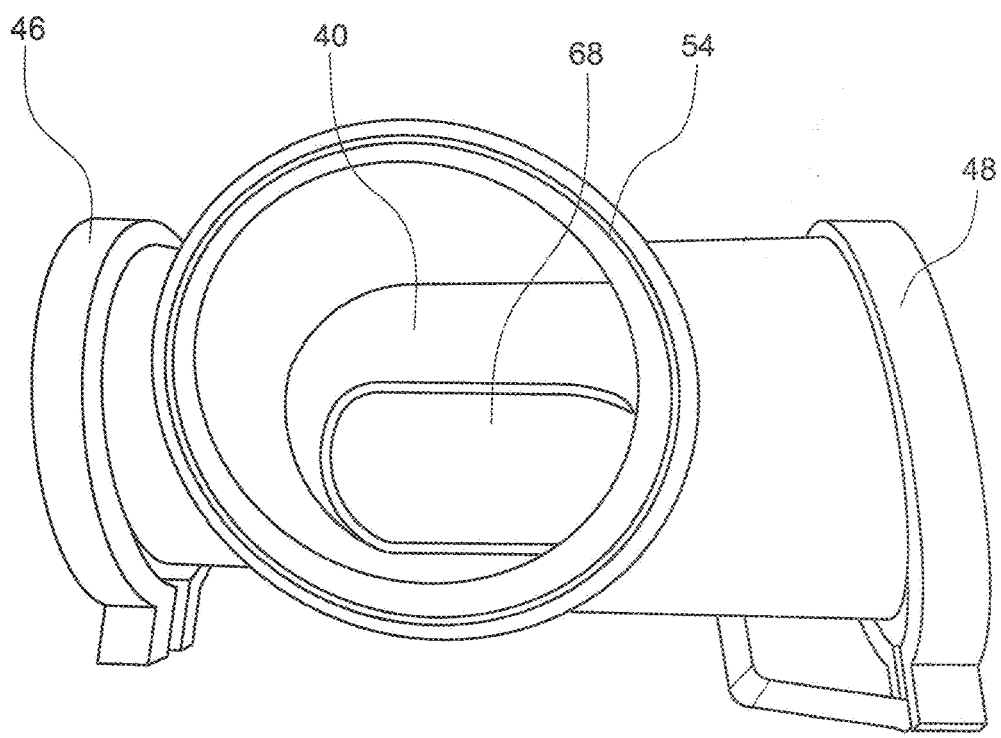
FIG. 5 is a plan view of the barrel feeder of the feeder assembly with parts removed shown installed in the housing assembly and illustrating the barrel feeder in a loading position.

As shown in FIG. 2, the cross fitting 44 also includes an open ended inlet member 54 sealable by an inlet cap 56. In addition, the cross fitting 44 includes an open ended outlet member 58 that connects to a discharge conduit 60. The discharge conduit 60 can comprise one or more welded or bolted tubular members shaped to provide a sealed flow path for the metal powder 14 (FIG. 1) from the barrel feeder 40 to the mixing hearth 16 (FIG. 1). As shown in FIGS. 4 and 5, the barrel feeder 40 includes a feeder port opening 68 that can be aligned with the inlet member 54 in a loading position (FIG. 6A) of the barrel feeder 40 and with the outlet member 58 in a feeding position (FIG. 6B) of the barrel feeder 40. In the illustrative embodiment, the feeder port opening 68 has an elongated oblong shape with radiused ends. However, other geometrical shapes can be utilized (e.g., circular, rectangular).

Figure 8:
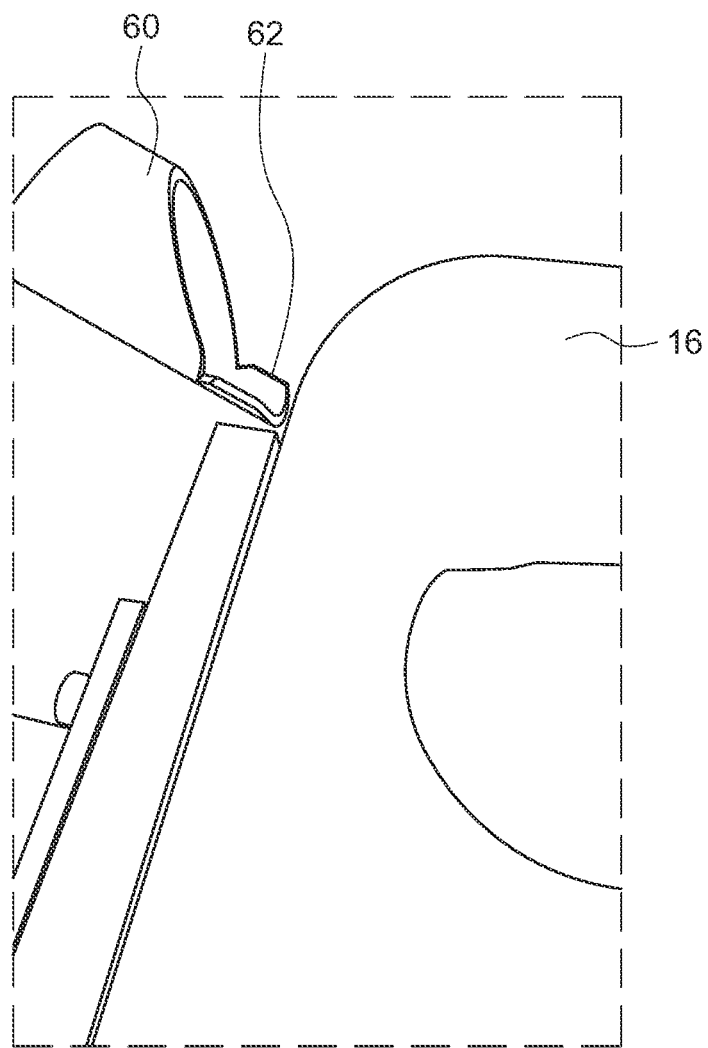
FIG. 8 is a perspective view of a discharge conduit of the feeder assembly shown mounted to the foundry system in proximity to the mixing hearth.
Figure 11:
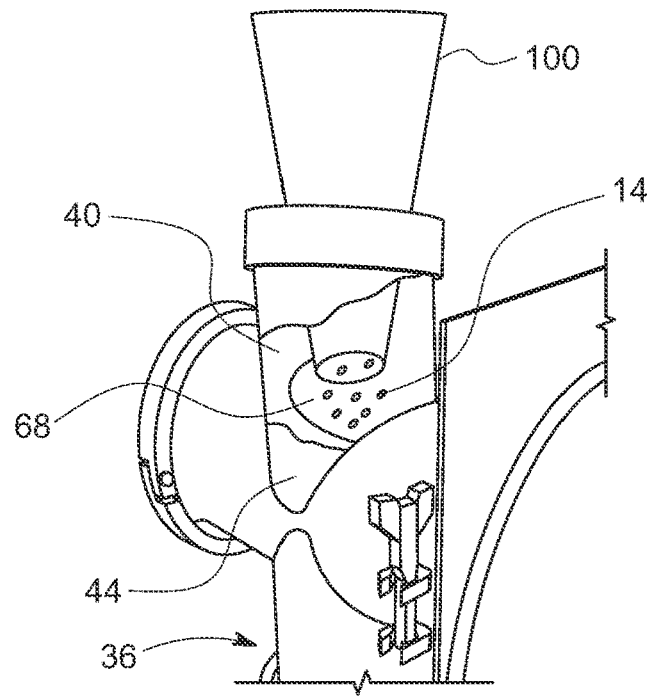
FIG. 11 is a schematic view of a hopper of the housing assembly of the powder feeder system with the housing assembly partially cut away to illustrate feeding of the metal powder into the feeder port opening of the barrel feeder.

As shown in FIG. 2, the housing assembly 36 also includes a mounting plate 64 around the discharge conduit 60 configured to attach to the external wall 32 (FIG. 1) of the foundry system 12 (FIG. 1) using threaded fasteners 66. As shown in FIG. 8, the discharge conduit 60 can also include a discharge lip 62 for directing the metal powder 14 (FIG. 1) into the mixing hearth 16. As shown in FIG. 11, the housing assembly can optionally include a hopper 100 configured to continuously feed the metal powder 14 into the feeder port opening 68 of the barrel feeder 40. Additional sealing elements, such as a simple valve (not shown) can also be used to seal the hopper 100 and the barrel feeder 40.

Figure 3:
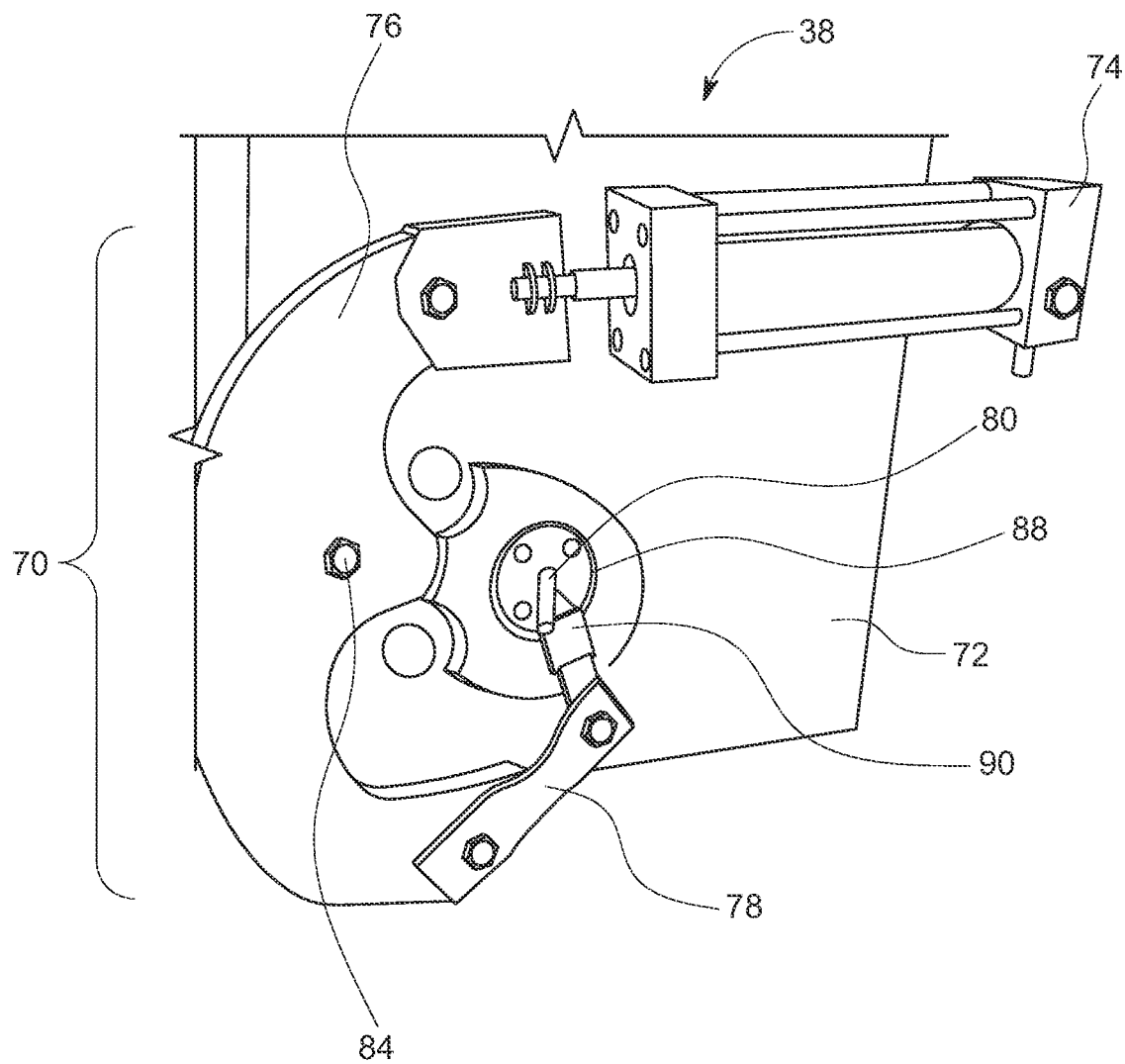
FIG. 3 is a side elevation view of a feeder assembly of the powder feeder system with parts removed taken along line 3-3 of FIG. 1 illustrating a bell crank assembly of a feeder assembly of the powder feeder system.
Figure 6A:
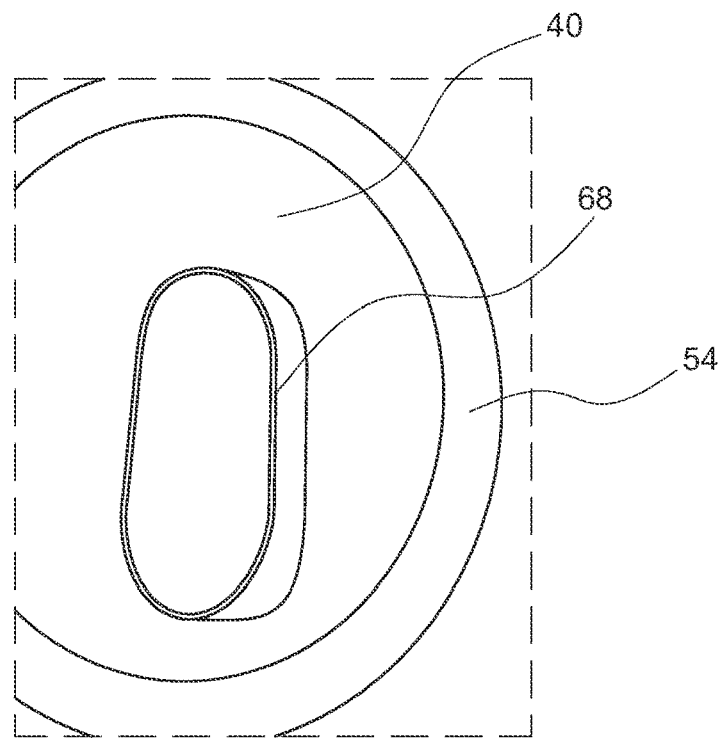
FIG. 6A is a plan view of the barrel feeder of the feeder assembly with parts removed shown installed in the housing assembly and illustrating the feeder port in the loading position.
Figure 6B:
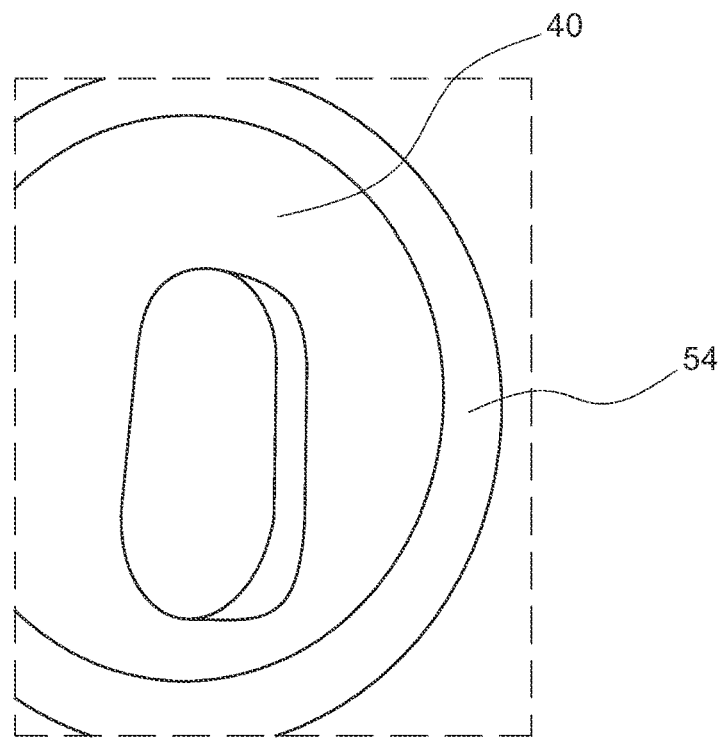
FIG. 6B is a plan view of the barrel feeder of the feeder assembly with parts removed shown installed in the housing assembly and illustrating the feeder port opening in a feeding position.

Referring to FIG. 3, additional components of the feeder assembly 38 are shown separately. As previously explained, the feeder assembly 38 includes the barrel feeder 40 rotatably mounted in the housing assembly 36 for positioning in the loading position (FIG. 6A) or the feeding position (FIG. 6B). The feeder assembly 38 also includes a drive assembly 70 configured to position the barrel feeder 40 in the loading position (FIG. 6A) in which the pre-weighed charge of the metal powder 42 (FIG. 10) is loaded into the barrel feeder 40, or the feeding position in which the metal powder 14 (FIG. 1) is discharged into the mixing hearth 16 (FIG. 1).

Figure 7:
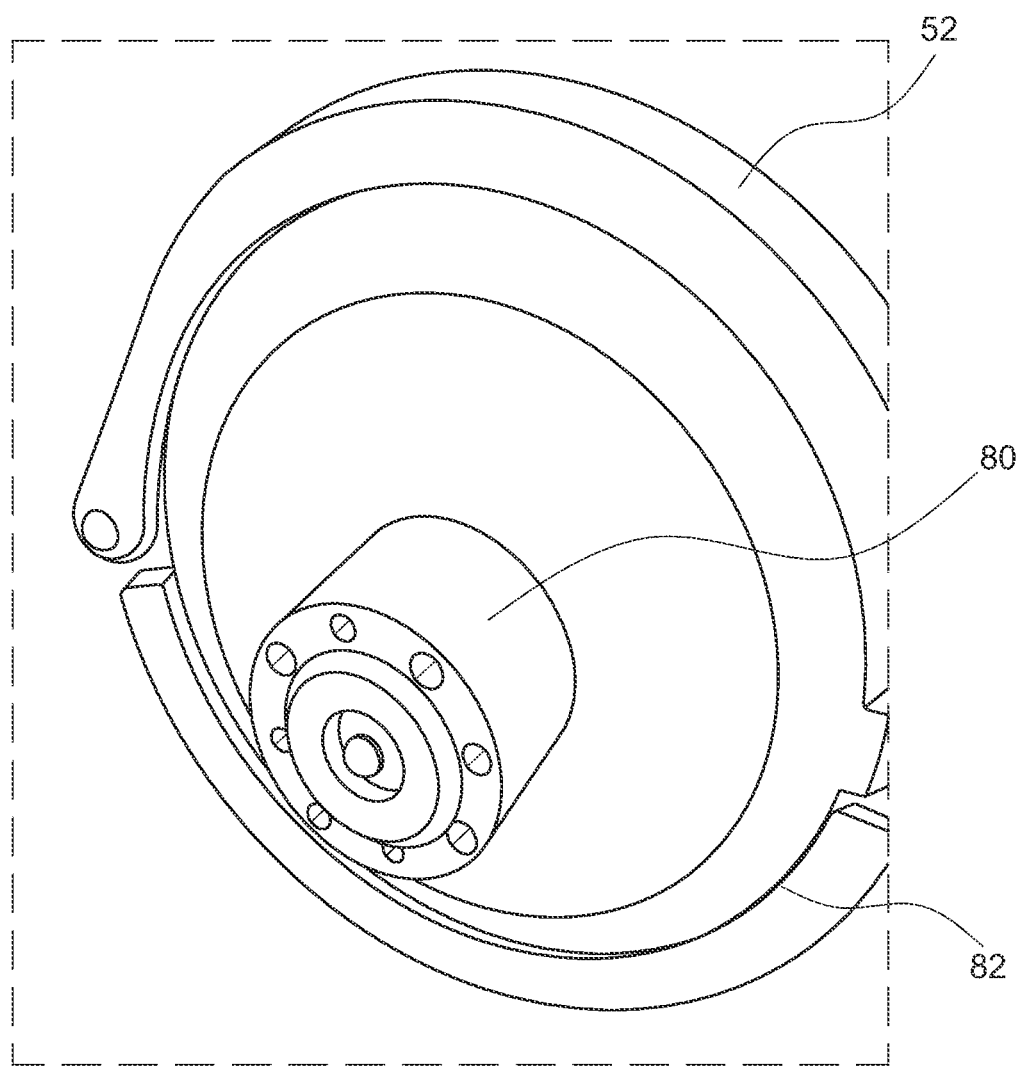
FIG. 7 is a perspective view of the barrel feeder of the feeder assembly with parts removed illustrating a drive shaft and vacuum seal of the barrel feeder.

In the illustrative embodiment the drive assembly 70 comprises a hyrdraulically actuated bell crank, but can also comprise any other known drive system such as a mechanical and or electrical device which can be used to actuate the barrel feeder 40 on demand. As shown in FIG. 3, the drive assembly 70 can include a support plate 72, a hydraulic cylinder 74, a first linkage 76 attached to the hydraulic cylinder 74, and a second linkage 78 attached to a shaft 80 (FIG. 7) on the right end plate 52 of the barrel feeder 40. The shaft 80 extends through an opening 88 in the support plate 72 and a coupling 90 attaches the shaft 80 to the second linkage 78. As shown in FIG. 7, the barrel feeder 40 also includes a vacuum seal 82 on the right end plate 52 for sealing the barrel feeder 40 in the housing assembly 36. In the feeding position (FIG. 6B), the housing assembly 36 is completely sealed by the inlet cap 56, the closed left ring member 46, the sealed mounting plate 64 and by the vacuum seal 82. With this arrangement the interior of the barrel feeder 40 and the inside diameter of the discharge conduit 60 are in sealed vacuum communication with the sealed chamber 18 of the foundry system 12. In the embodiment with the hopper 100 additional sealing elements (not shown) can also be added to the barrel feeder 40.

As shown in FIG. 3, the first linkage 76 can be mounted to a pivot bolt 84 attached to the support plate 72 such that extension of the hydraulic cylinder 74 rotates the barrel feeder 40 from the loading position (FIG. 6A) to the feeding position (FIG. 6B). Conversely, retraction of the hydraulic cylinder 74 rotates the barrel feeder 40 from the discharge position (FIG. 6B) to the feeding position (FIG. 6A).

Figure 9A:
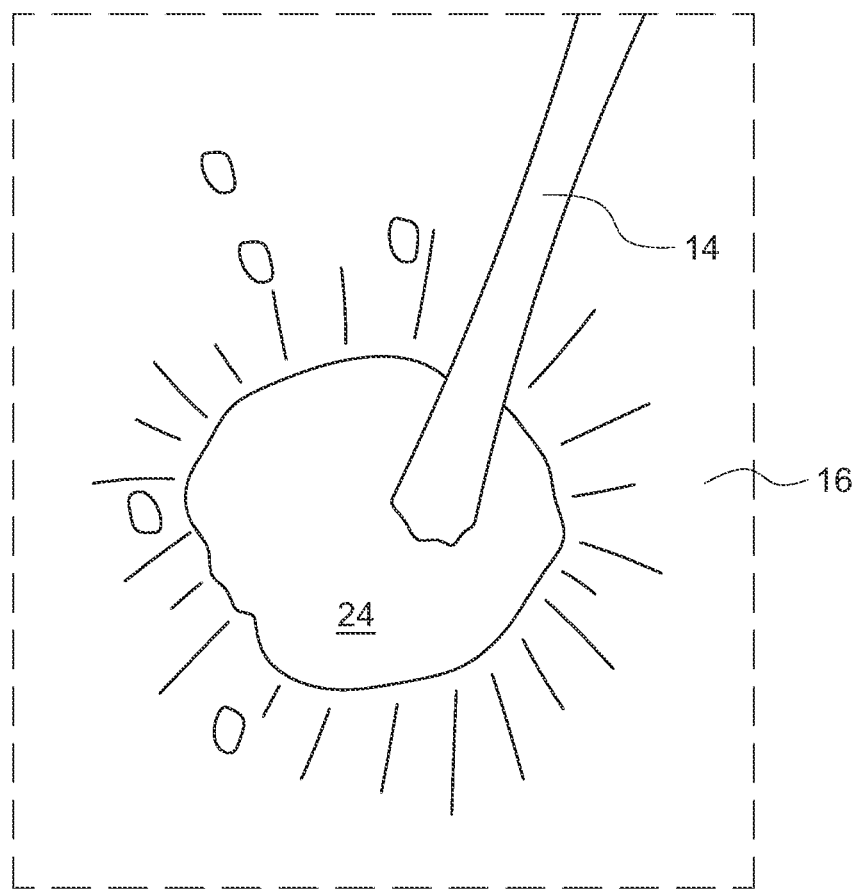
FIG. 9A is a perspective view of the foundry system with parts removed illustrating the mixing hearth containing a molten metal during operation thereof.
Figure 9B:
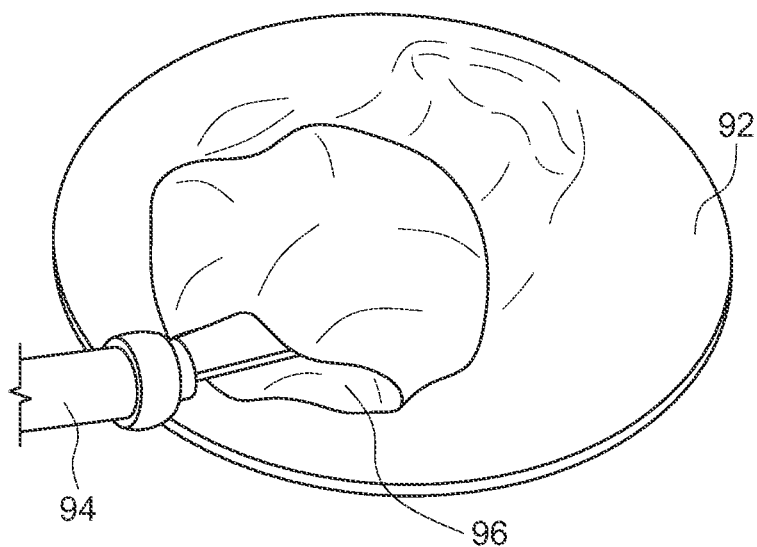
FIG. 9B is a perspective view of a metal skull formed in the mixing hearth using the powder feeder system and a recycled metal powder illustrating a lava tube in the metal skull.

Referring again to FIG. 1, the drive assembly 70, and the housing assembly 36 as well, can be supported by a framework 86 that attaches to the floor, walls or some solid structure (not shown). FIG. 9A illustrates the pool of molten metal 24 forming in the mixing hearth 16 as the metal powder 14 is inserted by the feeder assembly 38 into the mixing hearth 16. FIG. 9B illustrates a partially hardened hearth skull cap 92 formed following cooling of the molten metal 24 in which a bladed tool 94 can be used to show lava tubes 96 in the hearth skull cap 92. FIG. 10 shows the barrel feeder 40 on a scale 98 illustrating its capability to hold a pre-weighed charge of metal powder 42 of approximately 2 kg.

Method. The powder feeding system 10 (FIG. 1) allows pre-weighed charges 42 (FIG. 10) of any size metal powder 14 (FIG. 1) including recycled and contaminated powder to be delivered on demand to the mixing hearth 16 (FIG. 1) of the foundry system 12 (FIG. 1). In addition, the powder feeding system 10 can deliver the metal powder 14 (FIG. 1) into a pool of molten metal 24 (FIG. 9A) at the moment the heat source 28 (FIG. 1) is turned off, but prior to the hearth skull cap 92 (FIG. 9B) freezing over.

An operational sequence can include the following steps:

A. Loading the pre-weighed charge 42 (FIG. 10) into the barrel feeder 40 (FIG. 6A). During loading, the barrel feeder 40 (FIG. 6A) is in the loading position (FIG. 6A). In addition, the inlet member 54 (FIG. 2) can be opened for loading the pre-weighed charge of metal powder 42 (FIG. 10) by removing the inlet cap 56 (FIG. 1).

B. Sealing the reaction chamber 18 (FIG. 1), which includes sealing the housing assembly 36 (FIG. 1) using the inlet cap 56 (FIG. 1).

C. Melting a content of the mixing hearth 16 (FIG. 1) completely to form the molten metal 24 (FIG. 1). Prior to performing the melting step the mixing hearth 16 (FIG. 1) can be loaded with a desired amount of metal, such as a feedstock or a recycled metal, having a desired chemical composition.

D. Feeding the metal powder 14 (FIG. 1) into the mixing hearth 16 (FIG. 1) while the contents of the mixing hearth 16 (FIG. 1) are still molten using the powder feeder system 10 (FIG. 1). The feeding step can be performed by controlling the feeder assembly 38 (FIG. 3) and the drive assembly 70 to move the barrel feeder 40 into the discharge position (FIG. 6B).

Example. All testing was done with 2 kg of 75-150 powder Inconel 718 from heat 181229-R1 and a water contaminated Inconel 718 skull from a previous heat. During the initial test, the powder feeder system 10 (FIG. 1) was mounted on the north viewport, the viewport angle is 25 degree from horizontal. This angle proved to be insufficient to transition the powder through the discharge conduit 60 (FIG. 1) and left approximately 500 grams (~25% of the charge of metal powder 42) in the last part of the discharge conduit 60 (FIG. 1). The discharge conduit 60 (FIG. 1) was then moved to the south viewport 34 (FIG. 1) that offered a better 53 degree angle from horizontal and did allow all of the powder 14 to transition through the discharge conduit 60 (FIG. 1). The placement of the discharge conduit 60 (FIG. 1) at this location blocks the main camera view but puts the discharge lip 62 (FIG. 1) in close proximity to the heat source 28 (FIG. 1), which in this example was a plasma torch.

A method for recycling metal powder 14 included the steps of melting the contents of the mixing hearth 16 (FIG. 1) completely, then turning off the heat source 28 (FIG. 1) and immediately initiating powder feeding by rotating the barrel feeder 40 (FIG. 6B) to the feeding position (FIG. 6B) while the contents of the mixing hearth 16 (FIG. 1) was still molten. This allowed the metal powder 14 (FIG. 1) to penetrate the surface of the pool of molten metal 24 (FIG. 1). After the skull cap 92 (FIG. 9B) solidified, the heat source 28 (FIG. 1) was restarted. Prior to the restart, the sealed chamber 18 (FIG. 1) was opened. Upon visual inspection of the skull cap 92 (FIG. 9B) the powder was seen to be predominantly clumped together and had formed a gas pocket that was expanding while the skull cap 92 (FIG. 9B) was cooling.

While a number of exemplary aspects and embodiments have been discussed above, those of skill in the art will recognize certain modifications, permutations, additions and subcombinations thereof. It is therefore intended that the following appended claims and claims hereafter introduced are interpreted to include all such modifications, permutations, additions and sub-combinations as are within their true spirit and scope.

What is claimed is:

1. A powder feeder system for a foundry system having a mixing hearth configured to form a molten metal comprising:
   a housing assembly comprising a plurality of tubular members configured to provide a sealed flow path for an additive manufacturing metal powder to the mixing hearth, the tubular members including a discharge conduit configured to discharge the additive manufacturing metal powder into the mixing hearth; and
   a feeder assembly in the housing assembly comprising a moveable barrel feeder in flow communication with the discharge conduit configured to feed a pre-weighed charge of the additive manufacturing metal powder on demand through the discharge conduit into the mixing hearth of the foundry system during operation thereof, such that the additive manufacturing metal powder penetrates a surface of the molten metal in the mixing hearth.

2. The powder feeder system of claim 1 wherein the feeder assembly comprises a drive assembly configured to position the barrel feeder in a loading position in which the pre-weighed charge of the additive manufacturing metal powder is loaded into the barrel feeder, or a feeding position in which the pre-weighed charge of the additive manufacturing metal powder is discharged through the discharge conduit into the mixing hearth.

3. The powder feeder system of claim 2 wherein the barrel feeder of the feeder assembly comprises a hollow cylindrical member having sidewalls, sealed end plates and an internal chamber for the additive manufacturing metal powder.

4. The powder feeder system of claim 3 wherein the barrel feeder includes a feeder port opening extending through the sidewalls into the internal chamber thereof.

5. The powder feeder system of claim 4 wherein the housing assembly includes a hopper configured to feed the additive manufacturing metal powder into the feeder port opening of the barrel feeder.

6. The powder feeder system of claim 5 wherein the additive manufacturing metal powder comprises a recycled metal powder.

7. The powder feeder system of claim 6 wherein the additive manufacturing metal powder comprises a metal selected from the group consisting of titanium, zirconium, nickel, cobalt and alloys thereof.

8. A powder feeder system for a foundry system having a mixing hearth configured to form a molten metal comprising:
- a housing assembly comprising a plurality of tubular members configured to provide a sealed flow path for an additive manufacturing metal powder to the mixing hearth, the tubular members including a discharge conduit configured to discharge the additive manufacturing metal powder into the mixing hearth; and
- a feeder assembly in the housing assembly configured to feed the additive manufacturing metal powder into the mixing hearth of the foundry system during operation thereof, the feeder assembly comprising a moveable barrel feeder in flow communication with the discharge conduit, and a drive assembly configured to position the barrel feeder in a loading position in which a pre-weighed charge of the additive manufacturing metal powder is loaded into the barrel feeder, or a feeding position in which the pre-weighed charge of the metal powder is directed through the discharge conduit into the mixing hearth such that the additive manufacturing metal powder penetrates a surface of the molten metal in the mixing hearth, the barrel feeder comprising a hollow cylindrical member having sidewalls, sealed end plates, an internal chamber for the additive manufacturing metal powder, and a feeder port opening extending through the sidewalls into the internal chamber thereof.

9. A powder feeder system for a foundry system having a mixing hearth comprising:
- a housing assembly comprising a plurality of tubular members configured to provide a sealed flow path for a metal powder to the mixing hearth, the tubular members including a discharge conduit in proximity to the mixing hearth; and
- a feeder assembly in the housing assembly configured to feed a metal powder into the mixing hearth of the foundry system during operation thereof, the feeder assembly comprising a moveable barrel feeder in flow communication with the discharge conduit, and a drive assembly configured to position the barrel feeder in a loading position in which a pre-weighed charge of the metal powder is loaded into the barrel feeder, or a feeding position in which the metal powder is inserted into the mixing hearth, the barrel feeder comprising a hollow cylindrical member having sidewalls, sealed end plates, an internal chamber for the metal powder, and a feeder port opening extending through the sidewalls into the internal chamber thereof,
- wherein the housing assembly comprises a cross fitting wherein the barrel feeder of the feeder assembly is mounted for rotation.

10. A powder feeder system for a foundry system having a mixing hearth comprising:
- a housing assembly comprising a plurality of tubular members configured to provide a sealed flow path for a metal powder to the mixing hearth, the tubular members including a discharge conduit in proximity to the mixing hearth; and
- a feeder assembly in the housing assembly configured to feed a metal powder into the mixing hearth of the foundry system during operation thereof, the feeder assembly comprising a moveable barrel feeder in flow communication with the discharge conduit, and a drive assembly configured to position the barrel feeder in a loading position in which a pre-weighed charge of the metal powder is loaded into the barrel feeder, or a feeding position in which the metal powder is inserted into the mixing hearth, the barrel feeder comprising a hollow cylindrical member having sidewalls, sealed end plates, an internal chamber for the metal powder, and a feeder port opening extending through the sidewalls into the internal chamber thereof,
- wherein the drive assembly comprises a bell crank having a support plate, a hydraulic cylinder attached to the support plate, and at least one linkage attached to a shaft on the barrel feeder.

11. The powder feeder system of claim 10 wherein the housing assembly includes a hopper configured to feed the metal powder into the feeder port opening of the barrel feeder.

12. A powder feeder system for a foundry system having a mixing hearth comprising:
- a housing assembly comprising a plurality of tubular members configured to provide a sealed flow path for a metal powder to the mixing hearth, the tubular members including a discharge conduit in proximity to the mixing hearth; and
- a feeder assembly in the housing assembly configured to feed a metal powder into the mixing hearth of the foundry system during operation thereof, the feeder assembly comprising a moveable barrel feeder in flow communication with the discharge conduit, and a drive assembly configured to position the barrel feeder in a loading position in which a pre-weighed charge of the metal powder is loaded into the barrel feeder, or a feeding position in which the metal powder is inserted into the mixing hearth, the barrel feeder comprising a hollow cylindrical member having sidewalls, sealed end plates, an internal chamber for the metal powder, and a feeder port opening extending through the sidewalls into the internal chamber thereof,
- wherein the foundry system comprises a view port and the housing assembly is mounted to the view port.

13. The powder feeder system of claim 12 wherein the metal powder comprises a metal selected from the group consisting of titanium, zirconium, nickel, cobalt and alloys thereof.

14. A method for recycling an additive manufacturing metal powder comprising:
- providing a foundry system comprising a heat source and a mixing hearth contained in a sealed reaction chamber;
- providing a powder feeder system for the foundry system comprising a housing assembly comprising a plurality of tubular members configured to provide a sealed flow path for the additive manufacturing metal powder to the mixing hearth, and a feeder assembly having a moveable barrel feeder in the housing assembly for feeding a pre-weighed charge of the additive manufacturing metal powder into the mixing hearth of the foundry system during operation thereof;
- melting a content of the mixing hearth to form a pool of molten metal; and
- feeding the pre-weighed charge of the additive manufacturing metal powder into the mixing hearth, such that the additive manufacturing metal powder penetrates a surface of the molten metal in the mixing hearth.

15. The method of claim 14 further comprising turning off the heat source during the feeding step.

16. The method of claim 14 wherein the additive manufacturing metal powder comprises a recycled metal powder.

17. The method of claim 14 wherein the additive manufacturing metal powder comprises a metal selected from the group consisting of titanium, zirconium, nickel, cobalt and alloys thereof.

18. The method of claim 14 wherein the additive manufacturing metal powder comprises a recycled metal powder having particles with a diameter of from 1 µm to 4760 µm.

19. The method of claim 14 wherein the content of the mixing hearth comprises a feed stock or a recycled metal having a desired chemical composition.

20. The method of claim 14 wherein the feeder assembly comprises a drive assembly configured to position the barrel feeder in a loading position in which a pre-weighed charge of the additive manufacturing metal powder is loaded into the barrel feeder, or a feeding position in which the pre-weighed charge of the additive manufacturing metal powder is discharged through the discharge conduit into the mixing hearth.

* * * * *